United States Patent
Watari et al.

(10) Patent No.: US 11,870,304 B2
(45) Date of Patent: Jan. 9, 2024

(54) ROTARY ELECTRIC MACHINE WITH TUBULAR HOUSING AND FLANGE

(71) Applicant: Hitachi Automotive Systems, Ltd., Hitachinaka (JP)

(72) Inventors: Shinjirou Watari, Hitachinaka (JP); Shinji Yamazaki, Hitachinaka (JP); Mohdbasir Zulaika, Hitachinaka (JP)

(73) Assignee: Hitachi Astemo, Ltd, Hitachinaka (JP)

( * ) Notice: Subject to any disclaimer, the term of this patent is extended or adjusted under 35 U.S.C. 154(b) by 390 days.

(21) Appl. No.: 17/261,644

(22) PCT Filed: Jul. 11, 2019

(86) PCT No.: PCT/JP2019/027448
§ 371 (c)(1),
(2) Date: Jan. 20, 2021

(87) PCT Pub. No.: WO2020/026742
PCT Pub. Date: Feb. 6, 2020

(65) Prior Publication Data
US 2021/0265877 A1    Aug. 26, 2021

(30) Foreign Application Priority Data
Aug. 1, 2018 (JP) ................................. 2018-145005

(51) Int. Cl.
| | |
|---|---|
| *H02K 5/04* | (2006.01) |
| *H02K 5/24* | (2006.01) |
| *H02K 1/18* | (2006.01) |
| *H02K 11/40* | (2016.01) |
| *H02K 21/16* | (2006.01) |

(52) U.S. Cl.
CPC ............... *H02K 1/185* (2013.01); *H02K 5/04* (2013.01); *H02K 5/24* (2013.01); *H02K 11/40* (2016.01); *H02K 21/16* (2013.01)

(58) Field of Classification Search
CPC ........... H02K 1/18; H02K 1/185; H02K 5/02; H02K 5/04; H02K 5/22; H02K 5/24; H02K 15/14
See application file for complete search history.

(56) References Cited

FOREIGN PATENT DOCUMENTS

| DE | 10 2013 212 930 A1 | 1/2015 |
|---|---|---|
| JP | S57-082854 U | 5/1982 |
| JP | 2002-247800 A | 8/2002 |

(Continued)

OTHER PUBLICATIONS

Berkouk, Machine Translation of WO2017009123, Jan. 2017 (Year: 2017).*

(Continued)

*Primary Examiner* — Eric Johnson
(74) *Attorney, Agent, or Firm* — Foley & Lardner LLP

(57) ABSTRACT

The present invention provides a rotary electric machine with improved reliability by suppressing a partial increase in surface pressure generated in a stator using a housing with improved roundness. The rotary electric machine of the present invention has a rotor, a stator, and a tubular housing for fixing the stator from an outer peripheral side. The housing has a flange extending in an outer peripheral direction at an axial end portion of an outer peripheral surface, and the flange has a recess extending in a circumferential direction.

12 Claims, 20 Drawing Sheets

(56) References Cited

FOREIGN PATENT DOCUMENTS

| | | |
|---|---|---|
| JP | 2011-239576 A | 11/2011 |
| JP | 2012-019596 A | 1/2012 |
| JP | 2012-178963 A | 9/2012 |
| WO | WO-2017009123 A1 * | 1/2017 |

OTHER PUBLICATIONS

International Search Report with English translation and Written Opinion issued in corresponding application No. PCT/JP2019/027448 dated Oct. 8, 2019.

* cited by examiner

R PORTION

ROTARY ELECTRIC MACHINE WITH TUBULAR HOUSING AND FLANGE

TECHNICAL FIELD

The present invention relates to a rotary electric machine.

BACKGROUND ART

As a background technology in this technical field, there is JP 2011-239576 A (PTL 1). This publication describes a rotary electric machine that has a housing, in which a stator is fitted, formed with pleats that are bent in a radial direction and extend in a direction of a rotation axis, and the pleats extend so as to absorb dimensional variations in each member of a stator and suppress an increase in surface pressure generated in the stator.

CITATION LIST

Patent Literature

PTL 1: JP 2011-239576 A

SUMMARY OF INVENTION

Technical Problem

PTL 1 describes a rotary electric machine that suppresses an increase in surface pressure generated in a stator. However, the rotary electric machine described in PTL 1 has a structure in which the end portion of the housing is welded, and there is a concern about plastic deformation of the material due to this welding. Further, there is a concern that the roundness of the housing may deteriorate due to the welding of the end portion of the housing.

Therefore, the present invention provides a rotary electric machine having improved reliability by suppressing an increase in surface pressure generated in a stator by using a housing having improved roundness.

Solution to Problem

In order to solve the above problems, a rotary electric machine of the present invention includes a rotor, a stator, and a tubular housing for fixing the stator from an outer peripheral side, and the housing has a flange extending in an outer peripheral direction at an axial end portion of an outer peripheral surface, and the flange has a recess extending in a circumferential direction.

Advantageous Effects of Invention

According to the present invention, by using a housing with improved roundness, it is possible to provide a rotary electric machine in which an increase in surface pressure generated in a stator is suppressed and reliability is improved.

Problems, configurations, and effects other than those described above will be clarified by the following description of the embodiments.

BRIEF DESCRIPTION OF DRAWINGS

FIG. 8(*b*) is an explanatory diagram showing a second step of the manufacturing method of the housing 400 according to the comparative example.

FIG. 8 (*c*) is an explanatory diagram showing a third step of the manufacturing method of the housing 400 according to the comparative example.

FIG. 8 (*d*) is an explanatory diagram showing a fourth step of the manufacturing method of the housing 400 according to the comparative example.

FIG. 8 (*e*) is an explanatory diagram showing a fifth step of the manufacturing method of the housing 400 according to the comparative example.

FIG. 8 (*f*) is an explanatory diagram showing a sixth step of the manufacturing method of the housing 400 according to the comparative example.

FIG. 9(*b*) is explanatory diagram showing a second step of the manufacturing method of the housing 400 according to the present embodiment.

FIG. 9(*c*) is an explanatory diagram showing a third step of the manufacturing method of the housing 400 according to the present embodiment.

FIG. 9(*d*) is an explanatory diagram showing a fourth step of the manufacturing method of the housing 400 according to the present embodiment.

FIG. 9(*e*) is an explanatory diagram showing a fifth step of the manufacturing method of the housing 400 according the present embodiment.

FIG. 9(*f*) is an explanatory diagram showing a sixth step of the manufacturing method of the housing 400 according to the present embodiment.

DESCRIPTION OF EMBODIMENTS

Figure 1:
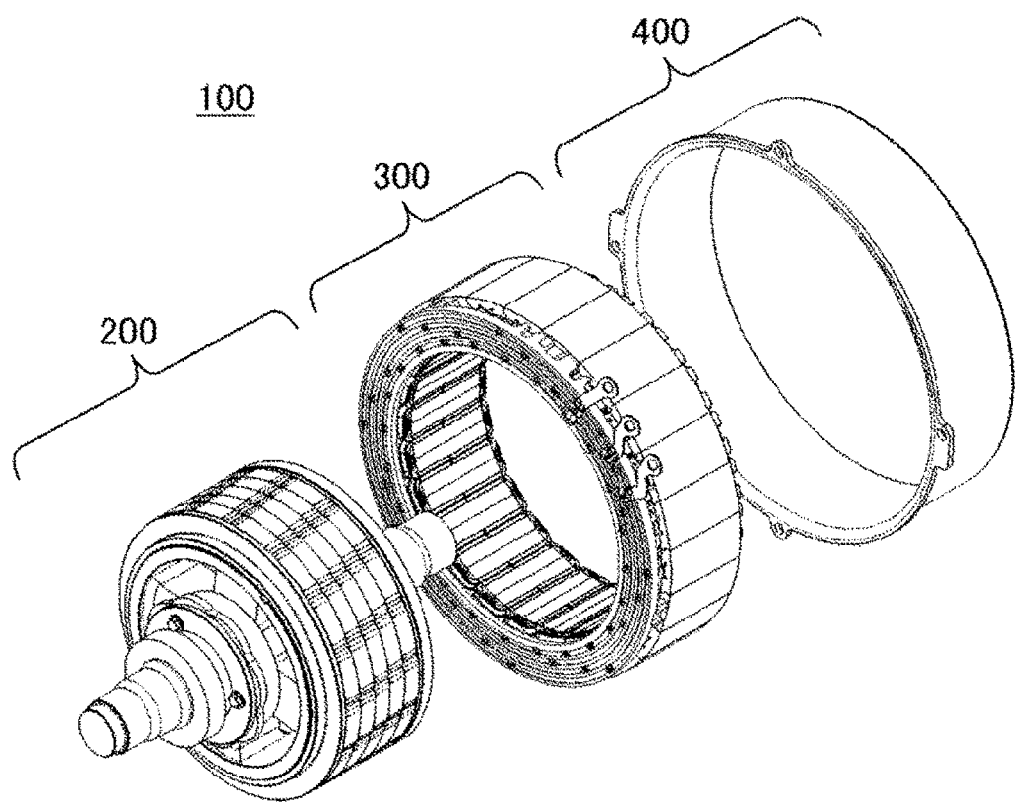
FIG. 1 is an exploded perspective view of a rotary electric machine 100 according to the present embodiment.

Hereinafter, embodiments of the present invention will be described with reference to the drawings. In each drawing, the same components may be designated by the same reference numerals, and the description of overlapping portions may be omitted.

Embodiment 1

A rotary electric machine for an automobile and a generator is required to have a high output, and the rotary electric machine is also increasing in size as the output increases. As a result, holding force of a stator fitted in the housing of the rotary electric machine also increases, and surface pressure generated in the stator also increases accordingly.

When the surface pressure generated in the stator increases, an electromagnetic steel plate located on an end face of the stator may be damaged, and it is important to reduce stress on the stator.

FIG. 1 is an exploded perspective view of a rotary electric machine 100 according to the present embodiment.

The rotary electric machine 100 is composed of a rotor 200, a stator 300, and a housing 400. In particular, a motor for an automobile and a motor for a generator are required to have a high output, and as the output increases, size of the rotary electric machine 100 also increases.

The rotor 200 includes a plurality of rotor cores and permanent magnets. The plurality of rotor cores is arranged in a direction of a rotation axis and skewed (torque pulsation is suppressed) from each other.

The stator 300 includes a divided core and a coil wound around the core. An outer periphery of the stator 300 is fixed to an inner periphery of the housing 400 by shrink fitting.

As the size of the rotary electric machine 100 increases, for example, when the housing 400 is mounted on an electric vehicle, a plate thickness of the housing 400 increases in order to withstand vibration of the electric vehicle. On the other hand, the housing 400 is formed by press working or drawing in order to improve productivity. Pressing may be more preferable as the plate thickness increases.

That is, the rotary electric machine 100 has the rotor 200, the stator 300, and the housing 400, and the housing 400 has a tubular shape and fixes the stator 300 from an outer peripheral side.

Figure 2:
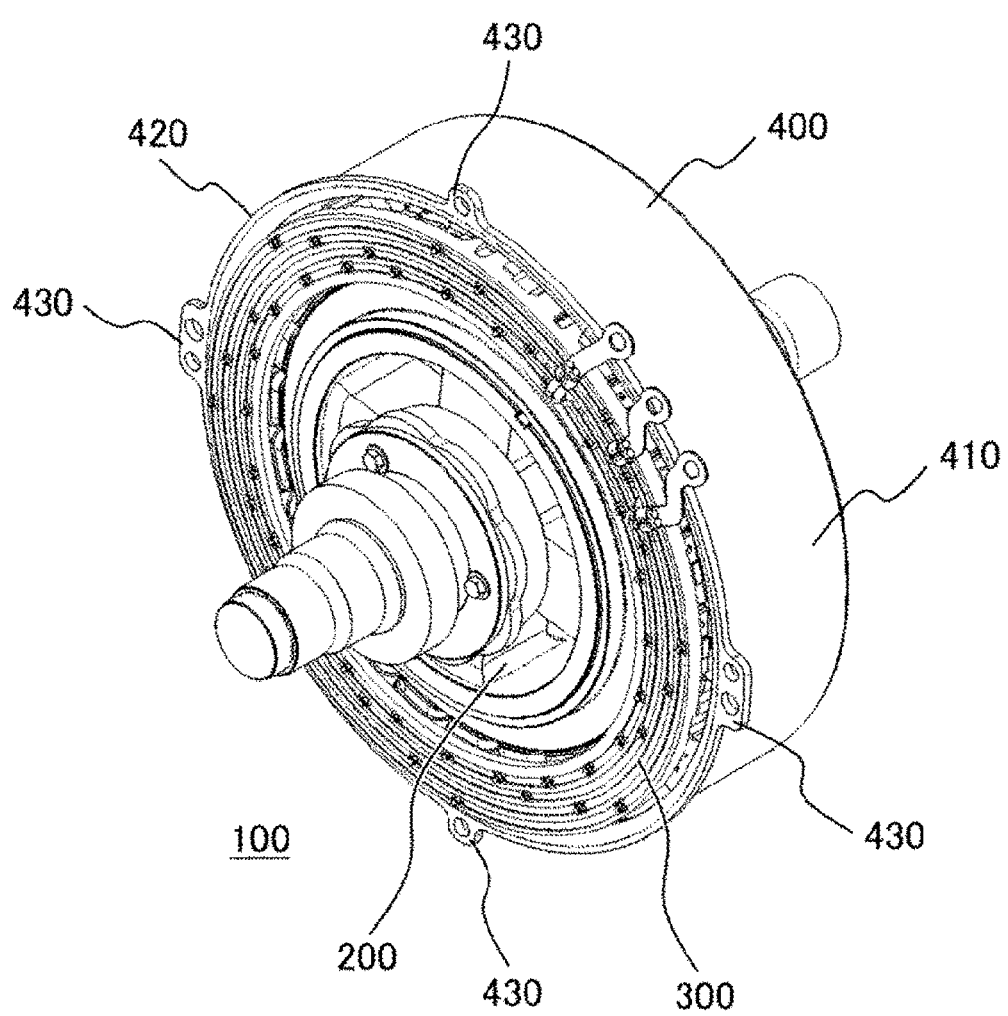
FIG. 2 is an external perspective view of the rotary electric machine 100 according to the present embodiment.

FIG. 2 is an external perspective view of the rotary electric machine 100 according to the present embodiment.

The housing 400 of the rotary electric machine 100 is shrink-fitted and fixed to the stator 300.

The housing 400 has a tubular portion 410 for tightening and fixing the stator 300 from the outer peripheral side, and a flange (flat surface portion) 420 is formed at an axial end portion of an outer peripheral surface of the housing 400. A tab (mounting surface) 430 that serves as a mounting surface with a mating member (not shown) is formed on a part of the flange 420. The flange 420 is formed at the axial end portion of the outer peripheral surface of the housing 400 and extends in an outer peripheral direction of the housing 400.

Further, the tab 430 is formed at the axial end portion of the outer peripheral surface of the housing 400, and is formed so as to partially extend in the outer peripheral direction of the housing 400 from the flange 420.

Figure 3:
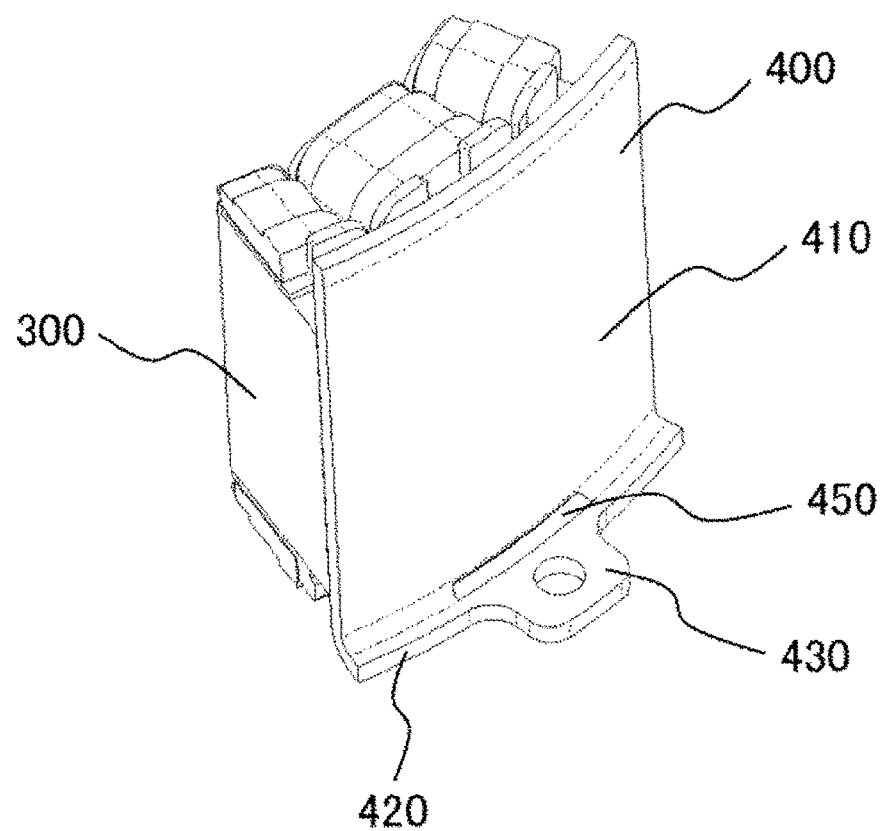
FIG. 3 is a partial external perspective view of the rotary electric machine 100 according to the present embodiment.

FIG. 3 is a partial external perspective view of the rotary electric machine 100 according to the present embodiment.

The housing 400 is shrink-fitted and fixed to the stator 300 and has the tubular portion 410, the flange 420 and the tab 430.

The flange 420 has a recess 450 extending in a circumferential direction at the axial end portion of the outer peripheral surface of the housing 400. As a result, roundness of the housing 400 can be improved, and an increase in surface pressure generated in the stator 300 can be suppressed. The recess 450 is preferably 10% to 15% deep with respect to a thickness of the flange 420. As a result, the roundness of the housing 400 can be improved.

The stator 300 having the housing 400 described in the present embodiment has the tubular housing 400 for fixing the stator 300 from the outer peripheral side, the housing 400 is formed by pressing or drawing from a flat plate, and has the flange 420 extending in the outer peripheral direction at the axial end portion of the outer peripheral surface, and the flange 420 has a plurality of the recesses 450 extending in the circumferential direction.

Figure 4:
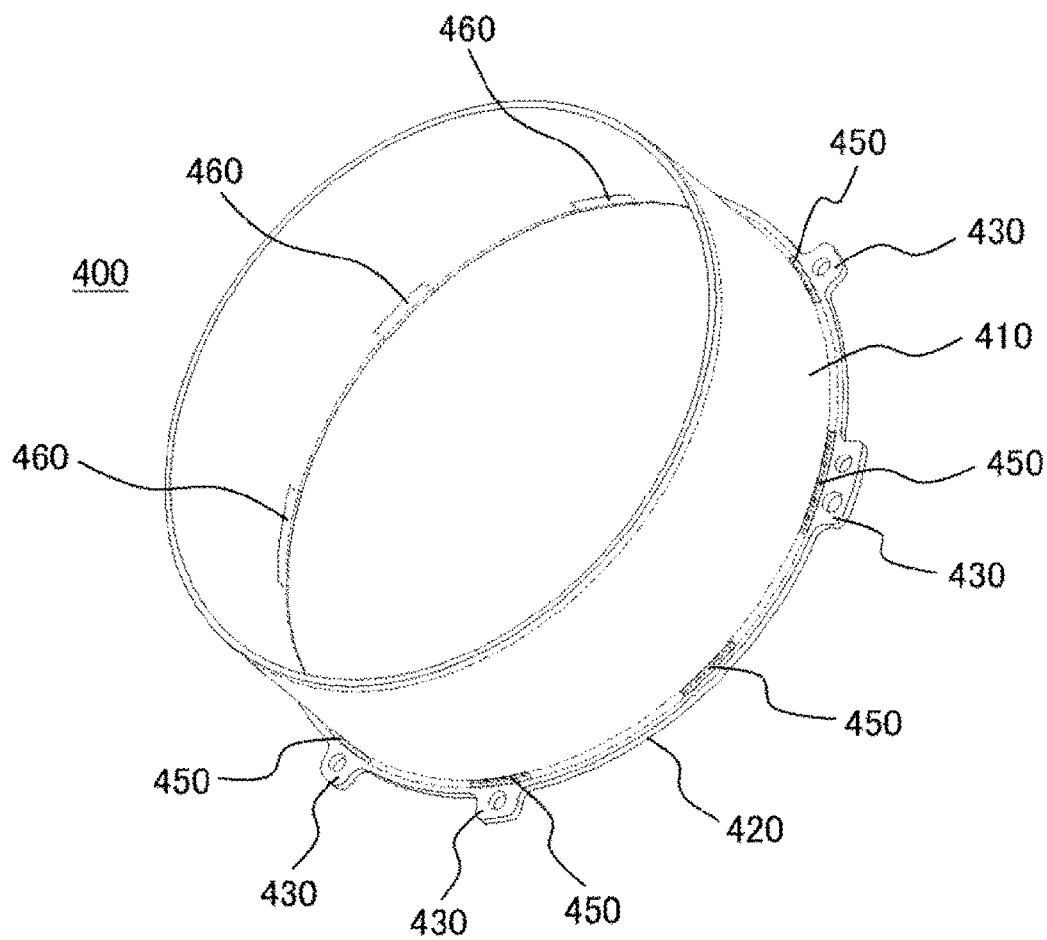
FIG. 4 is an external perspective view of a housing 400 according to the present embodiment.

FIG. 4 is an external perspective view of the housing 400 according to the present embodiment.

The housing 400 has the tubular portion 410, the flange 420, and a plurality of the tabs 430 (six locations in the present embodiment).

There are two types of tabs 430 having different lengths in the circumferential direction of the housing 400, and the tabs 430 of the same type are formed so as to face each other with respect to a center of the housing 400.

The flange 420 has the plurality of recesses 450 (eight locations in the present embodiment) extending in the circumferential direction at the axial end portion of the outer peripheral surface of the housing 400. As a result, roundness of the housing 400 can be improved, and an increase in surface pressure generated in the stator 300 can be suppressed.

The recesses 450 are formed at substantially equal pitches in the circumferential direction of the housing 400.

The recesses 450 are formed on a portion of the flange 420 on which the tabs 430 are formed, and are also formed on a portion of the flange 420 on which the tabs 430 are not formed.

Further, lengths of the recesses 450 (the lengths of the recesses 450 in the circumferential direction of the housing 400) may be the same, and portions of the flange 420 on which the long tabs 430 are formed may be made long, and the portions of the flange 420 on which the short tabs 430 are formed may be made short according to the lengths of the tabs 430.

That is, the plurality of recesses 450 is intermittently formed in the circumferential direction of the flange 420.

Further, projections 460 are formed on an inner peripheral surface of the cylindrical portion 410 of the housing 400 in which the recesses 450 are formed.

The stator 300 having the housing 400 described in the present embodiment has the plurality of tabs 430 formed on the flange 420, the recesses 450 are formed on a portion of the flange 420 on which the tabs 430 are formed, and the projections 460 are formed in an inner peripheral portion of the housing 400, and on an opposite surface of portions in which the recesses 450 are formed.

Figure 5:
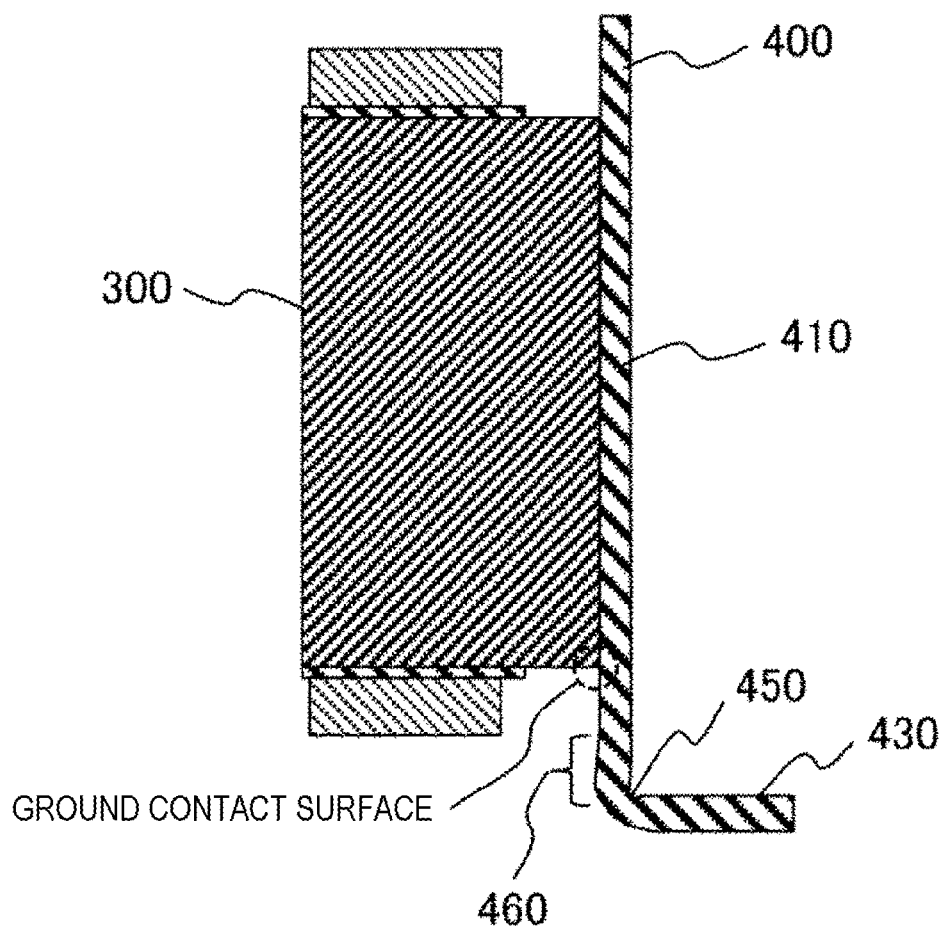
FIG. 5 is a partial sectional diagram of the rotary electric machine 100 according to the present embodiment.

FIG. 5 is a partial sectional diagram of the rotary electric machine 100 according to the present embodiment.

In particular, FIG. 5 shows a positional relationship between the stator 300 and the projections 460 formed on the housing 400. The projections 460 are formed apart from a ground contact surface between the stator 300 and the housing 400. As a result, the roundness of the tubular portion 410 of the housing 400 in an axial direction that is in contact with the stator 300 is secured, and the surface pressure generated in the stator 300 can be reduced. Each projection 460 is not a rectangular projection but a smooth-shaped projecting portion.

That is, the projections 460 are formed in the inner peripheral portion of the housing 400, and on the opposite surface of the portions in which the recesses 450 are formed. As a result, the projections 460 are also formed at substantially equal pitches in the circumferential direction of the housing 400.

Figure 6:
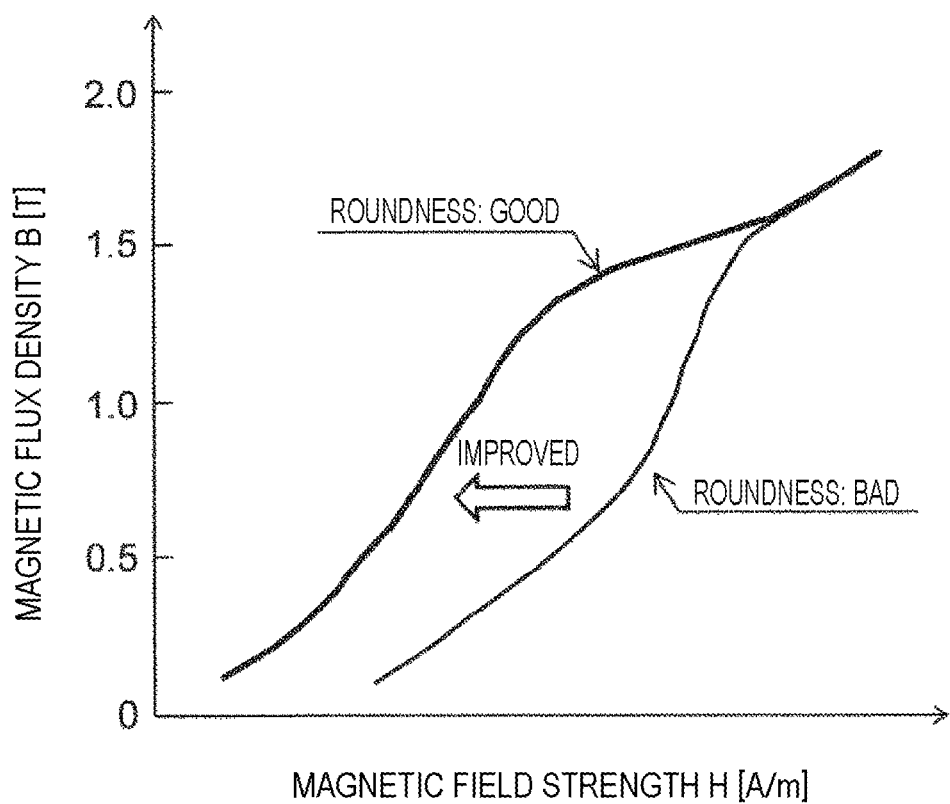
FIG. 6 is an explanatory graph showing how roundness of a housing affects magnetic characteristics of a stator (relationship between magnetic field strength and magnetic flux density) according to the present embodiment.

FIG. 6 is an explanatory graph showing how the roundness of a housing affects magnetic characteristics of a stator (relationship between magnetic field strength and magnetic flux density) according to the present embodiment.

From FIG. 6, it can be seen that the magnetic flux density increases with respect to the magnetic field strength as the roundness improves.

Figure 7:
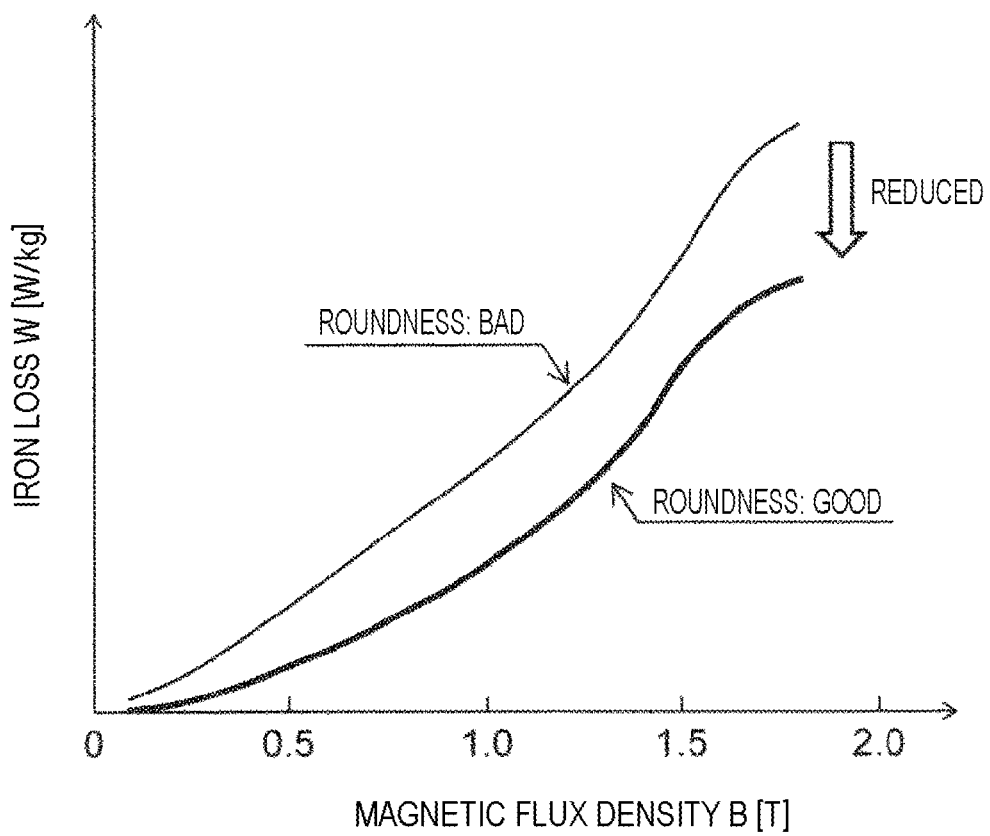
FIG. 7 is an explanatory graph showing how the roundness of the housing affects the magnetic characteristics of the stator (relationship between magnetic flux density and iron loss) according to the present embodiment.

FIG. 7 is an explanatory graph showing how the roundness of the housing affects the magnetic characteristics of the stator (relationship between magnetic flux density and iron loss) according to the present embodiment.

From FIG. 7, it can be seen that the iron loss is reduced with respect to the magnetic flux density as the roundness improves.

That is, as the roundness improves, the surface pressure generated in the stator 300 can be reduced, and compressive stress acting on the stator 300 can be reduced. The magnetic characteristics improve, and the output of the rotary electric machine increases, or efficiency of the rotary electric machine increases. The roundness represents a deviation from a geometrically correct circle, and the roundness "good" indicates being closer to the geometrically correct circle.

As described above, in the present embodiment, deterioration of the magnetic characteristics due to the compressive stress can be suppressed, and a rotary electric machine having better motor characteristics can be provided.

FIGS. 8(a) to 8(f) are perspective diagrams showing first to sixth steps of a manufacturing method of the housing 400 according to a comparative example. Note that FIGS. 8(b) to 8(f) have an upper view and a lower view, and the upper view is a plan view and the lower view is a cross-sectional view.

When the housing 400 is manufactured, in order to improve productivity, the housing 400 is manufactured from a rolled roll material through a drawing step in the order of FIGS. 8(a) to 8(f).

Figure 8A:
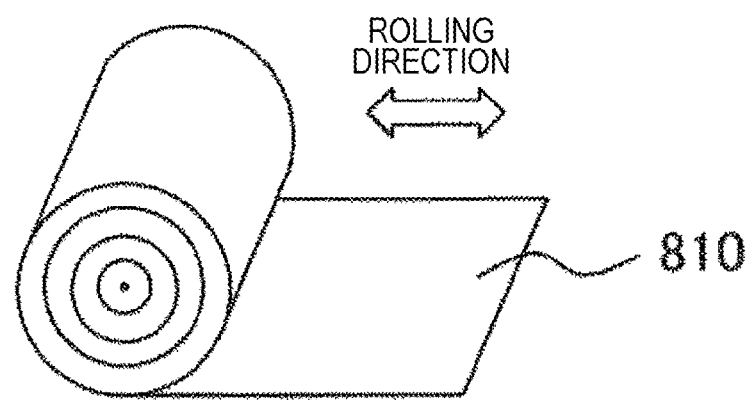
FIG. 8(*a*) is a perspective view showing a first step of a manufacturing method of a housing 400 according to a comparative example.
Figure 8B:
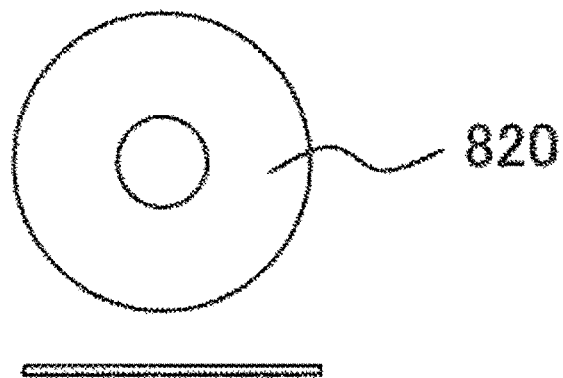

As shown in FIG. 8(a), a roll material (flat plate) 810 rolled in a rolling direction is finished and manufactured to a predetermined size by passing a plate-shaped material between rotating rolls.

As shown in FIG. 8 (b), the roll material 810 is pressed and punched to form a blank material 820 having a predetermined shape.

Figure 8C:
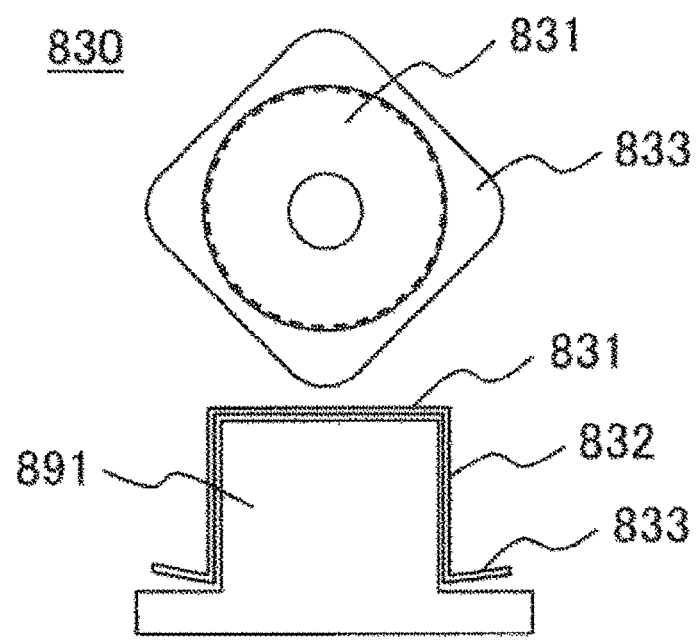

As shown in FIG. 8(c), a drawing material 830 is formed by processing the blank material 820 into a pot shape by drawing, and forming a bottom portion 831, a tubular portion 832 formed in the axial direction, and an outer peripheral portion 833 formed in a radial direction. The tubular portion 832, which becomes a main body portion 841 in the subsequent process, is drawn by a first jig 891 extending into a tubular shape, and is formed with good roundness.

Figure 8D:
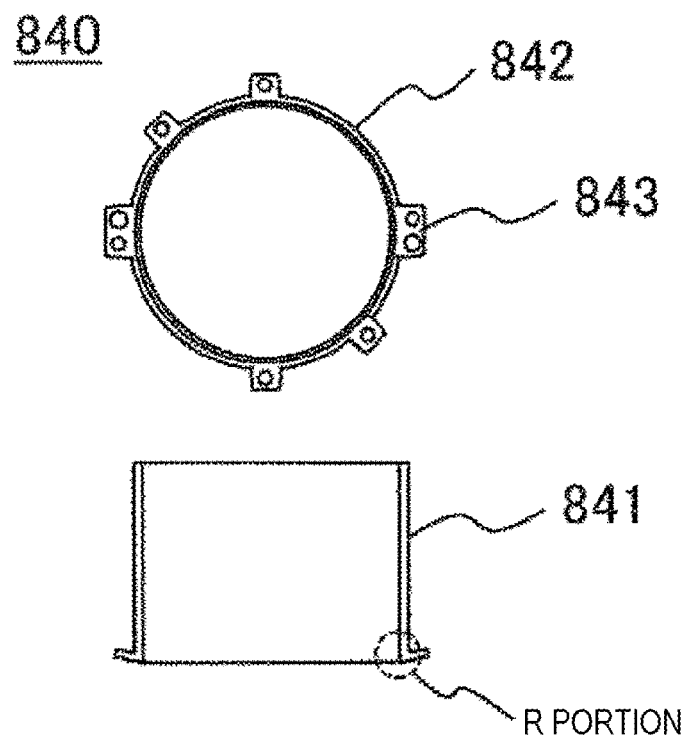

As shown in FIG. 8(d), a trimming material 840 has a substantially tubular shape by trimming the bottom portion 831 and the outer peripheral portion 833 of the drawing material 830.

That is, the trimming material 840 includes the main body portion 841 formed in a tubular shape in the axial direction, a flange portion 842 formed in the radial direction, and a mounting surface tab 843 formed from the flange portion 842. A root portion consisting of the axial end portion of the outer peripheral surface of the main body portion 841 and the flange portion 842 is bent at an acute angle, and an R portion is formed during pressing.

Figure 8E:
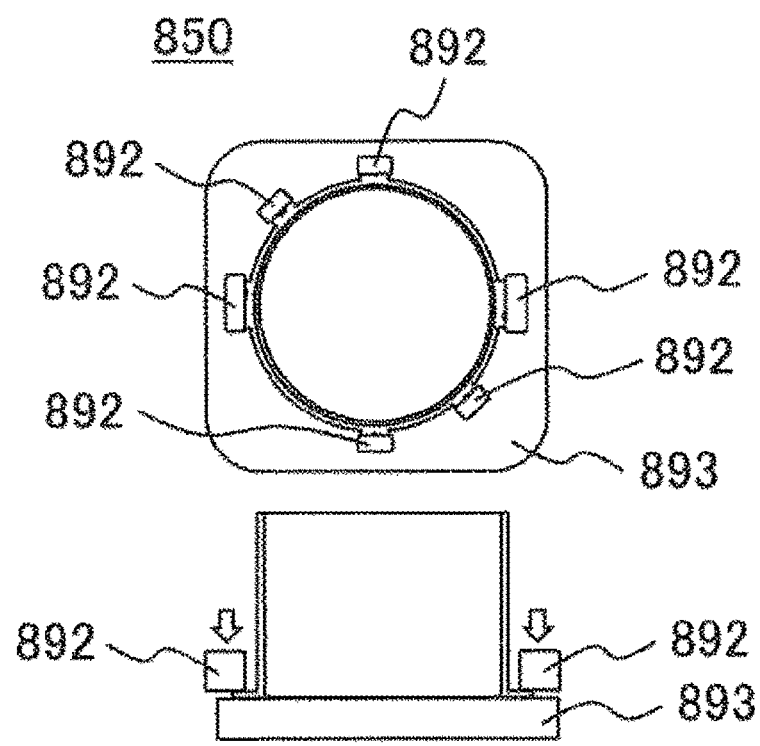

As shown in FIG. 8(e), a tab flattening process material 850 is pressed by a third jig 893 which is a pedestal and a second jig 892 which is pressed from above. At this time, the second jig 892 presses the mounting surface tab 843.

Figure 8F:
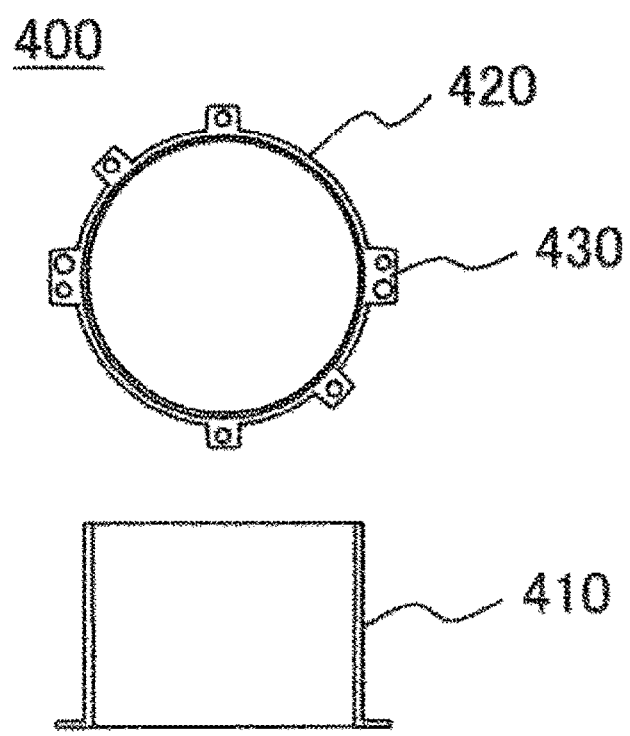

As shown in FIG. 8(f), in the steps described above, the housing 400 having the tubular portion 410, the flange 420, and the tabs 430 is manufactured.

Usually, the roll material 810 is a rolled material, and it is known that the properties are different (anisotropic) in the rolling direction and a predetermined angle direction (for example, 45° direction or 90° direction) with respect to the rolling direction. This anisotropy phenomenon also affects an amount of springback after bending.

Therefore, in the tab flattening process material 850 shown in FIG. 8 (e), even if all the tabs are pressed under the same conditions, in the housing 400 (final shape) shown in FIG. 8(f), the amount of springback differs, which also affects the roundness of the tubular portion 410 of the housing 400.

Further, in the drawing material 830 shown in FIG. 8(c), even if the first jig 891 having good roundness is used and the main body portion 841 is formed, when the main body portion 841 is released from the first jig 891, due to the anisotropy of the rolled material, the roundness deteriorates due to the difference in the amount of springback. Further, the roundness further deteriorates after the material becomes the trimming material 840 and the tab flattening process material 850.

FIGS. 9(a) to 9(f) are explanatory diagrams showing first to sixth steps of the manufacturing method of the housing 400 according to the present embodiment. Note that FIGS. 9(b) to 9(f) have an upper view and a lower view, and the upper view is a plan view and the lower view is a cross-sectional view. Further, the first to fourth steps shown in FIGS. 9(a) to 9(d) are the same steps as the first to fourth steps shown in FIGS. 8(a) to 8(d). Therefore, the description thereof will be omitted.

Figure 9A:
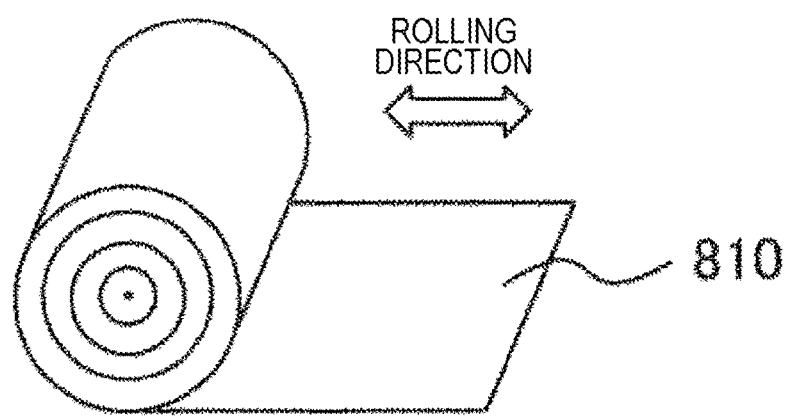
FIG. 9(*a*) is a perspective view showing a first step of the manufacturing method of the housing 400 according to the present embodiment.
Figure 9B:
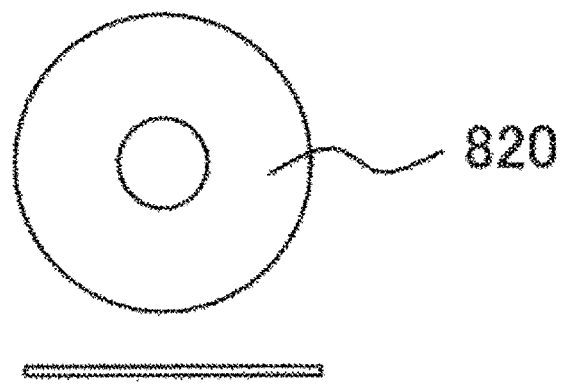
Figure 9C:
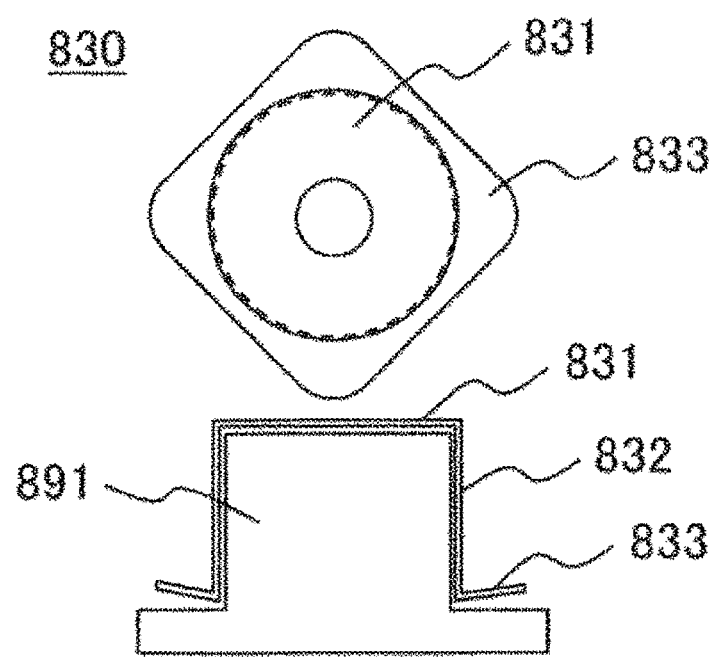
Figure 9D:
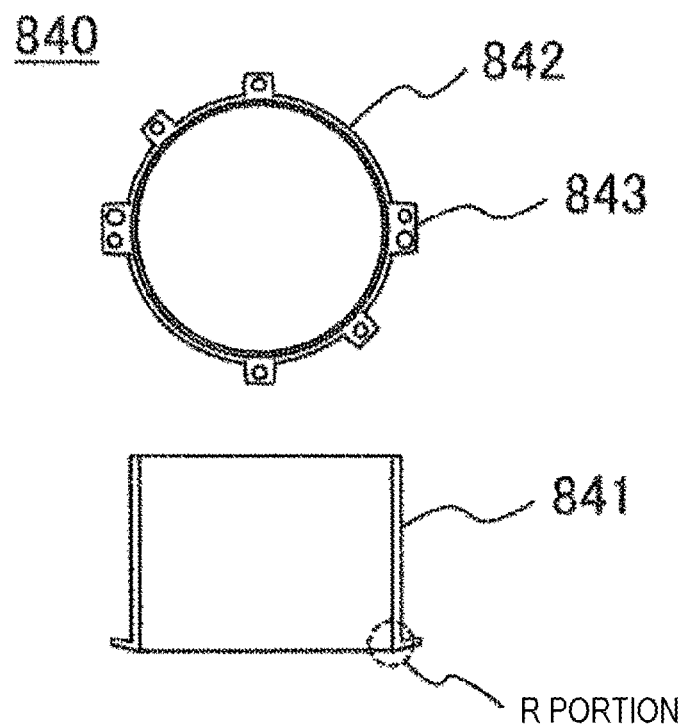
Figure 9E:
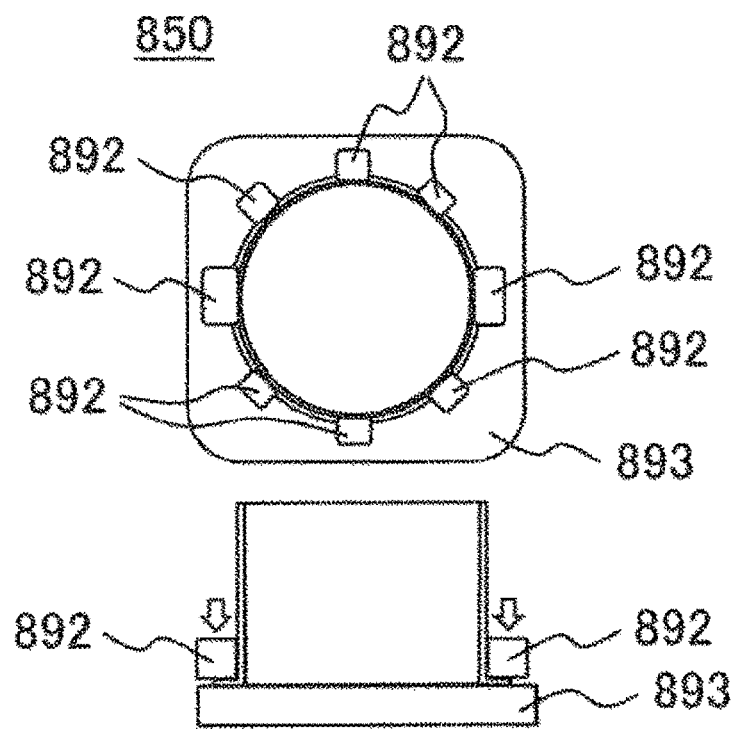

As shown in FIG. 9(e), the tab flattening process material 850 is press-molded and flattened by the third jig 893 which is a pedestal and the second jig 892 which is pressed from above. At this time, the second jig 892 presses the flange portion 842, and the second jig 892 presses the flange portion 842 at substantially equal pitches. Further, at the time of this pressing, a recess is formed in the housing, and at the same time, a projection is formed in the housing.

That is, a recess is formed in the R portion of the root portion consisting of the axial end portion of the outer peripheral surface of the main body portion 841 and the flange portion 842. This recess can correct deformation caused by the difference in the amount of springback due to the anisotropy of the rolled material, and can suppress the deterioration of the roundness.

Since the recess is formed by extending in the circumferential direction instead of extending in the axial direction, the deformation caused by the difference in the amount of springback is not locally corrected, so that a sufficient effect of suppressing the deterioration of the roundness can be obtained. By forming the recess extending in the circumferential direction, the deformation can be corrected as a whole, and good roundness can be maintained.

Figure 9F:
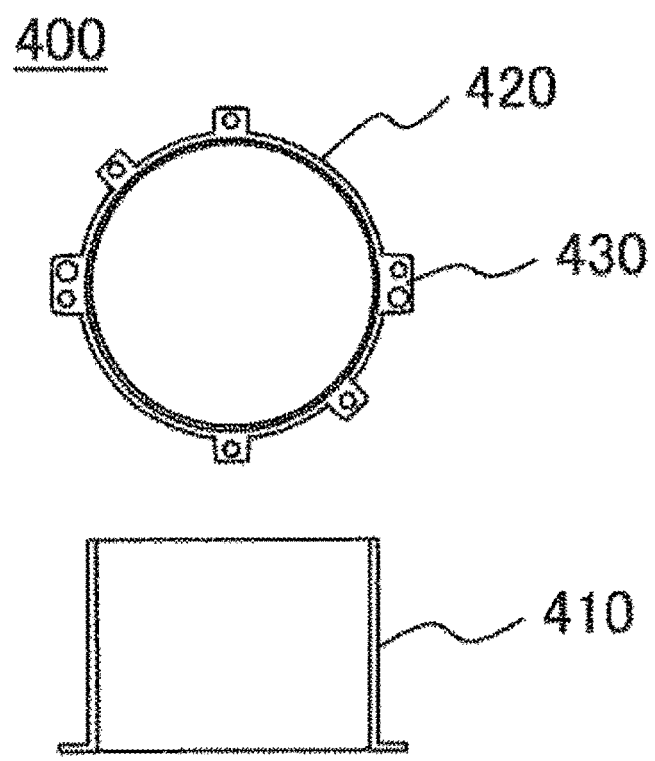

As shown in FIG. 9(f), in the steps described above, the housing 400 with good roundness having the tubular portion 410, the flange 420, and the tabs 430 is manufactured.

In particular, a rotary electric machine for an automobile increases in size as the output increases, the holding force of the stator to be fitted increases. Accordingly, the required strength for the housing increases, and thus an opportunity to choose a high-tensile steel plate is increasing Since the amount of springback is larger in the high-tensile steel plate than in an ordinary steel plate and it is considered that the springback greatly affects deterioration of the roundness, suppression of the springback by this method is effective.

As a result, it is possible to correct the deformation caused by the difference in the amount of springback due to the anisotropy of the rolled material, and it is possible to provide a housing with good roundness.

Note that it is necessary to flatten a surface with a tab in order to secure flatness of the tab, but in order to improve the roundness, it is desirable to perform press-molding at substantially equal pitches, and it is desirable to press-mold the flange without a tab. As a result, the housing can secure the flatness of the tab and a shape with good roundness.

As a result, even if the housing is thick and difficult to draw, by using a housing with good roundness, the surface pressure generated in the stator can be made uniform and a highly reliable rotary electric machine can be provided.

The roundness of the housing also affects the roundness of the stator and also an increase in magnetic noise. In addition, since it is necessary to consider an air gap between the rotor and the stator based on the roundness of the stator, in the present embodiment, an unnecessary air gap does not have to be set, and the rotary electric machine having good motor characteristics can be provided.

Embodiment 2

Figure 10:
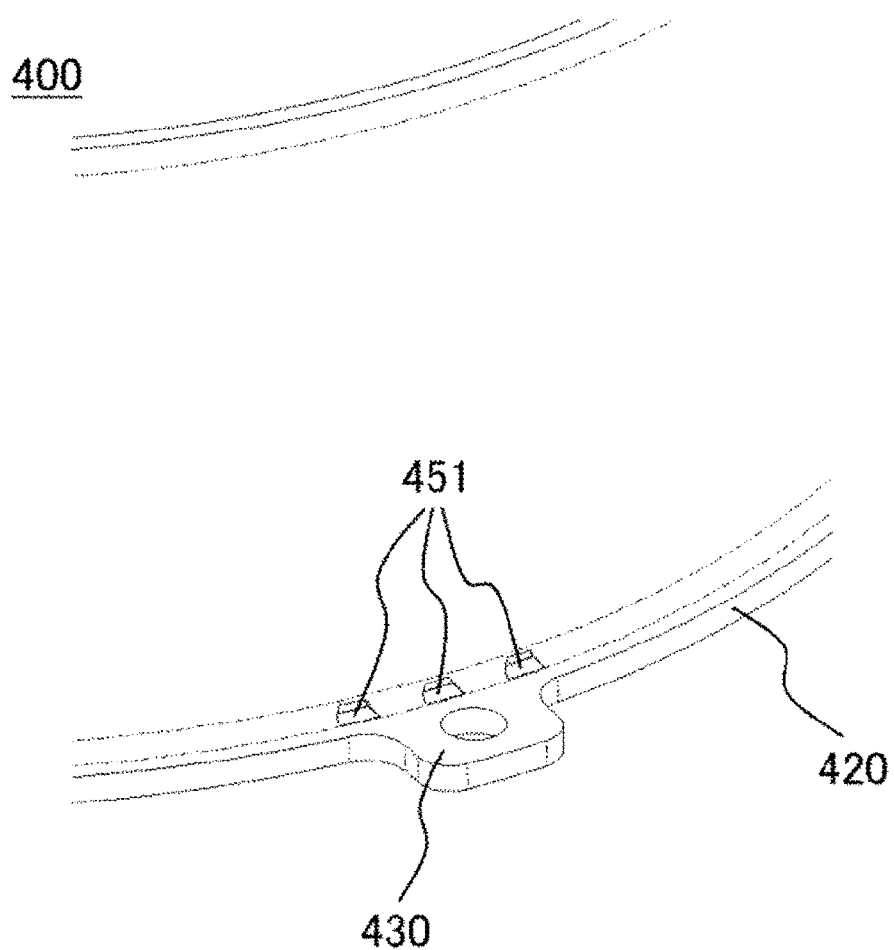
FIG. 10 is a partial external perspective view of the housing 400 according to another embodiment.

FIG. 10 is a partial external perspective view of the housing 400 according to another embodiment.

The flange 420 and the tabs 430 are formed in the housing 400, and recesses 451 are formed at the axial end portion of the outer peripheral surface of the housing 400 intermittently in the circumferential direction at substantially equal pitches.

That is, the recesses 451 are formed intermittently in the circumferential direction on a portion of the flange 420 on which the tabs 430 are formed.

According to the present embodiment, it is possible to provide a housing with improved roundness, and it is possible to suppress a partial increase in surface pressure generated in the stator.

The present invention is not limited to the above-mentioned embodiments, and includes various modifications.

REFERENCE SIGNS LIST 100 rotary electric machine
200 rotor
300 stator
400 housing
410 tubular portion
420 flange
430 tab
450 recess
460 projection

The invention claimed is:

1. A rotary electric machine comprising:
a rotor;
a stator; and
a tubular housing that fixes the stator from an outer peripheral side, wherein
the housing has a flange extending in an outer peripheral direction at an axial end portion of an outer peripheral surface, and
the flange has a recess extending in a circumferential direction, and a plurality of tabs are formed on the flange,
wherein the tabs comprises at least a pair of first tabs and at least a pair of second tabs longer in a circumferential direction than the pair of first tabs, the pair of first tabs being located so as to face each other with respect to a center of the housing, and the pair of second tabs being located so as to face each other with respect to the center of the housing, and each of the first and second tabs is provided with a hole,
wherein a projection is formed in a radially inner peripheral portion of the housing, and on an opposite surface of a portion in which the recess is formed.

2. The rotary electric machine according to claim 1, wherein
the recess is formed in a portion of the flange on which each of the tabs is formed.

3. The rotary electric machine according to claim 2, wherein the recess is formed in a portion of the flange on which at least one of the tabs is formed and a portion of the flange on which at least one of the tabs is not formed.

4. The rotary electric machine according to claim 2, wherein the recess is formed intermittently in the circumferential direction in a portion of the flange on which at least one of the tabs is formed.

5. The rotary electric machine according to claim 1, wherein a plurality of the recesses is intermittently formed in the circumferential direction of the flange.

6. The rotary electric machine according to claim 5, wherein a plurality of the recesses is intermittently formed in the circumferential direction of the flange in a portion of the flange on which at least one of the tabs is formed, and wherein the plurality of recesses comprises three recesses provided proximate to one tab of the at least a pair of first tabs at substantially equal pitches.

7. The rotary electric machine according to claim 1, wherein the projection is formed apart from a ground contact surface between the stator and the housing.

8. The rotary electric machine according to claim 1, wherein the recess and the projection are formed at substantially equal pitches with respect to the circumferential direction of the housing.

9. A stator comprising
a tubular housing that fixes a stator from an outer peripheral side, wherein
the housing is formed by pressing or drawing from a flat plate, and has a flange extending in an outer peripheral direction at an axial end portion of an outer peripheral surface, and
the flange has a plurality of recesses extending in a circumferential direction, and a plurality of tabs are formed on the flange,
wherein the tabs comprises at least a pair of first tabs and at least a pair of second tabs longer in a circumferential direction than the pair of first tabs, the pair of first tabs being located so as to face each other with respect to a center of the housing, and the pair of second tabs being located so as to face each other with respect to the center of the housing, and each of the first and second tabs is provided with a hole,
wherein a projection is formed in a radially inner peripheral portion of the housing, and on an opposite surface of a portion in which the recess is formed.

10. The stator according to claim 9, wherein
each of the recesses is formed in a portion of the flange on which each of the tabs is formed.

11. The rotary electric machine according to claim 9, wherein the number of first tabs is greater than the number of second tabs.

12. The stator according to claim 9, wherein a depth of a recess of the plurality of recesses is in a range of 10% to 15% with respect to a thickness of the flange.

\* \* \* \* \*